US008896152B2

(12) United States Patent
Beg et al.

(10) Patent No.: US 8,896,152 B2
(45) Date of Patent: Nov. 25, 2014

(54) SYSTEMS AND METHODS FOR OPERATING AN UNINTERRUPTIBLE POWER SUPPLY

(75) Inventors: Mirza A. Beg, Pepperell, MA (US); Venkatraman Chennakesavan, Groton, MA (US); Michael J. Ingemi, Norwood, MA (US); David E. Reilly, Concord, MA (US); Rajesh Ghosh, Bangalore (IN); Indra Prakash, Bangalore (IN)

(73) Assignee: Schneider Electric IT Corporation, West Kingston, RI (US)

( * ) Notice: Subject to any disclaimer, the term of this patent is extended or adjusted under 35 U.S.C. 154(b) by 768 days.

(21) Appl. No.: 13/173,405

(22) Filed: Jun. 30, 2011

(65) Prior Publication Data

US 2013/0002024 A1  Jan. 3, 2013

(51) Int. Cl.
  *H02J 9/00* (2006.01)
  *H02J 9/06* (2006.01)
  *H02J 1/10* (2006.01)

(52) U.S. Cl.
  CPC ...... *H02J 9/061* (2013.01); *H02J 1/108* (2013.01)
  USPC .................................. 307/64; 307/66; 307/65

(58) Field of Classification Search
  CPC ........................................................ H02J 9/00
  USPC ........................................................ 307/64
  See application file for complete search history.

(56) References Cited

U.S. PATENT DOCUMENTS

| | | | |
|---|---|---|---|
| 5,982,652 A | 11/1999 | Simonelli et al. | |
| 7,446,433 B2 | 11/2008 | Masciarelli et al. | |
| 7,939,968 B2 | 5/2011 | Hjort et al. | |
| 8,203,235 B2 * | 6/2012 | Fox et al. | 307/64 |
| 2004/0036449 A1 * | 2/2004 | Bean et al. | 320/166 |

(Continued)

FOREIGN PATENT DOCUMENTS

| | | |
|---|---|---|
| KR | 10-2010-0131342 | 12/2010 |
| WO | 2010/070676 A2 | 6/2010 |

OTHER PUBLICATIONS

Notification of Transmittal of the International Search Report and the Written Opinion of the International Searching Authority from corresponding PCT/US2012/044652 mailed Jun. 10, 2013.

*Primary Examiner* — Rexford Barnie
*Assistant Examiner* — Toan Vu
(74) *Attorney, Agent, or Firm* — Lando & Anastasi, LLP

(57) ABSTRACT

An uninterruptible power supply includes a first input to receive input power from an input power source, an output to provide output power, a switch, a first logic power supply coupled to the switch, a back-up power source, a charger, a main logic power supply and power converter circuitry. The switch is configured to close when a characteristic of the input power is within a selected range. The first logic power supply is coupled to the switch and configured to receive input power from the input power source when the switch is closed. The first logic power supply has a first DC output. The back-up power source has a second DC output and is coupled to the first DC output at a common node. The charger has a third DC output and is coupled to the common node. The main logic power supply is coupled to the common node and is configured to receive at least one of the first DC output, the second DC output and the third DC output. The power converter circuitry is coupled to the backup power source and the first input and is configured to provides the output power derived from at least one of power at the first input and power from the backup power source.

19 Claims, 5 Drawing Sheets

(56) References Cited

U.S. PATENT DOCUMENTS

| | | | |
|---|---|---|---|
| 2004/0223347 A1* | 11/2004 | Kobayashi et al. | 363/37 |
| 2005/0168073 A1* | 8/2005 | Hjort | 307/65 |
| 2006/0043797 A1 | 3/2006 | Hjort et al. | |
| 2010/0045107 A1 | 2/2010 | Cohen et al. | |
| 2012/0217809 A1* | 8/2012 | Sato et al. | 307/64 |

* cited by examiner

SYSTEMS AND METHODS FOR OPERATING AN UNINTERRUPTIBLE POWER SUPPLY

BACKGROUND

An uninterruptible power supply (UPS) is used to provide backup power to an electrical device, or load, when the primary power source, or mains, fails. Typical loads include computer systems, but other loads, such as heating/cooling/ventilation systems, lighting systems, network switches and routers, and security and data center management systems may also be powered by a UPS. A UPS designed for data center or industrial use may provide backup power for loads for several hours.

A UPS unit typically includes a logic power supply (LPS) and one or more batteries. The LPS is designed to receive power from the batteries or from a battery charger. Additionally, the batteries act as a power source when AC mains power is unavailable. The battery charger, which converts AC power to DC power, may be included in the UPS to charge the batteries when AC mains is available to ensure that backup power will be available when needed. The UPS may also include a control unit for automatically managing the operation of the UPS and the power conversion functions.

SUMMARY

According to one aspect, systems and methods for starting a UPS without a battery are provided. According to another aspect, systems and methods are provided for designing a UPS with a sleep mode, in which the UPS draws minimal power. According to another aspect, a UPS having a green or high energy efficient mode is provided.

According to one aspect, an uninterruptible power supply includes a first input to receive input power from an input power source, an output to provide output power, a switch, a first logic power supply, a backup power source, a charger, a main logic power supply, and power converter circuitry. The switch is configured to close when a characteristic of the input power is within a selected range. The first logic power supply is coupled to the switch and configured to receive input power from the input power source when the switch is closed. The first logic power supply has a first DC output. The backup power source has a second DC output and is coupled to the first DC output at a common node. The charger has a third DC output and is coupled to the common node. The main logic power supply is coupled to the common node and is configured to receive at least one of the first DC output, the second DC output and the third DC output. The power converter circuitry is coupled to the backup power source and the first input and is configured to provide the output power derived from at least one of power at the first input and power from the backup power source.

According to one embodiment, the uninterruptible power supply includes a main controller for controlling operation of the uninterruptible power supply and a communication circuit configured to allow a user to select a mode of operation of the uninterruptible power supply. The main logic power supply may be coupled to the main controller and the communication circuit. The main logic power supply may be configured to provide power to the main controller and the communication circuit. The uninterruptible power supply may include a second logic power supply coupled to the switch, configured to receive input power from the input power source when the switch is closed, and configured to power the communication circuit.

According to another embodiment, the power converter circuitry includes an AC-to-DC converter coupled to the first input and having a fourth DC output and an inverter coupled to the AC-to-DC converter and the UPS output. The charger may be further coupled to the AC-to-DC converter and the backup power source, and the charger may receive the fourth DC output and provide the third DC output to the backup power source to charge the backup power source.

According to another embodiment, the uninterruptible power supply includes a second input to receive second power from a second input power source. The second input may be selectively coupled to the UPS output to provide output power from the second power source.

According to one aspect, a method for providing uninterrupted power from a power supply is provided. The uninterrupted power supply has a first input to receive input power and a UPS output from which UPS output power is provided. The method includes providing power from the first input to a first logic power supply having a first DC output when the input power at the first input is acceptable, providing the first DC output to a main logic power supply having a MLPS output, providing the MLPS output to a main controller and a communication circuit, turning on, with the main controller, a charger having a third DC output, providing the third DC output to the main logic power supply, turning off the first logic power supply, and providing output power at the UPS output.

In one embodiment, the method includes providing power to the main logic power supply from a back-up power source having a second DC output upon loss of the input power. The method may include charging the back-up power source with the third DC output.

According to one embodiment, the method includes determining whether the charger is operating acceptably, and if the charger is not operating acceptably, turning on the first logic power supply. According to another embodiment, the method includes providing power from the first input to a second logic power supply, providing power to the communication circuit from the second logic power supply in a sleep mode of operation, and turning off the first logic power supply, the main logic power supply, the main controller and the charger in the sleep mode of operation.

According to another embodiment, the method includes providing power from the first input to an AC-to-DC converter having a fourth DC output, providing the fourth DC output to an inverter, and providing the fourth DC output to the charger. According to a further embodiment, the method includes providing power from a second input to the first logic power supply when the input power at the first input is not acceptable.

According to one aspect, an uninterruptible power supply is provided, including a first input to receive input power from an input power source, a backup power source, a UPS output, a charger, a main controller, a communication circuit, a main logic power supply, and means for providing power to the main logic power supply in a start up mode of operation from the input power bypassing the backup power source and the charger.

The backup power source has a DC output coupled to a common node. The UPS output is configured to provide output power derived from at least one of the input power and power from the backup power source. The charger is coupled to the backup power source through the common node. The main controller controls operation of the uninterruptible power supply. The communication circuit is configured to allow a user to select a mode of operation of the uninterruptible power supply. The main logic power supply is coupled to the common node, to receive input power from at least one of the charger and the backup power source and is configured to provide power to the main controller and the communication circuit.

In one embodiment, the uninterruptible power supply includes means for providing power to the communication circuit in a sleep mode of operation from the input power bypassing the backup power source and the charger. According to another embodiment, the uninterruptible power supply includes means for exiting the sleep mode of operation using the communication circuit. In another embodiment, uninterruptible power supply includes means for providing power to the main logic power supply through the charger in a green mode of operation bypassing a first logic power supply. According to a further embodiment, the uninterruptible power supply includes means for providing power to the main logic power supply in a green mode of operation bypassing the backup power source and the charger. According to another embodiment, the uninterruptible power supply includes means for providing power to the main logic power supply in a bypass mode of operation bypassing the first input. In another embodiment, the uninterruptible power supply includes means for providing the UPS output in a bypass mode of operation bypassing the backup power source, the charger and the main logic power supply.

BRIEF DESCRIPTION OF THE FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
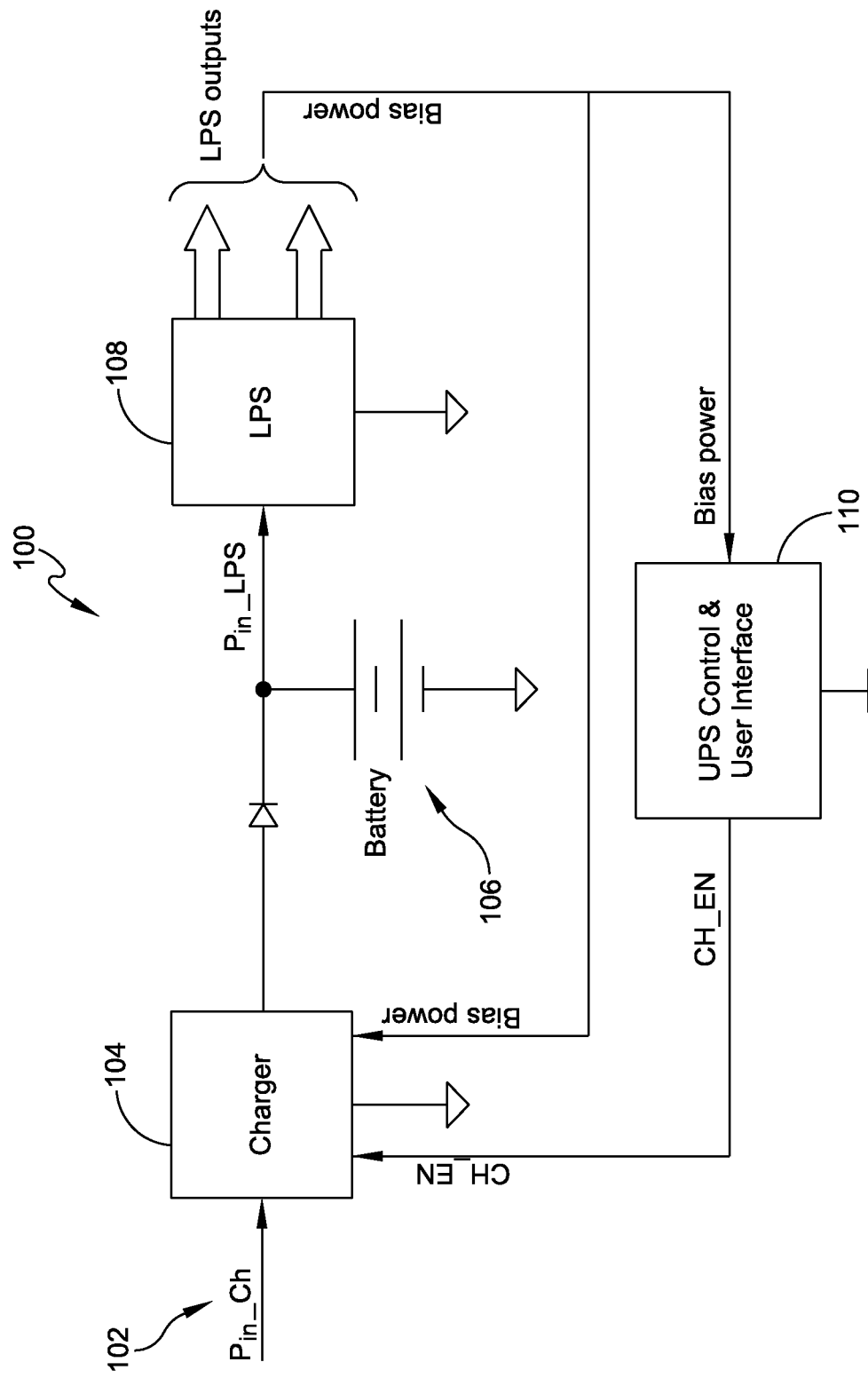
FIG. 1 is a schematic diagram of an existing LPS architecture.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various embodiments of the present disclosure relate to logic power supply (LPS) architectures for an uninterruptible power supply (UPS). An existing LPS architecture 100 is shown in FIG. 1. Mains power 102 is input to a charger 104. The charger 104 outputs power to a battery 106 and a LPS 108. The LPS 108 provides bias power to a UPS control and user interface 110 and to the charger 104. The battery 106 provides the initial start-up power to the LPS 108. The battery 106 receives its charge from the charger 104. If the mains power 102 is unavailable, the charger 104 is unavailable, and the LPS 108 begins to drain the battery 106. When the mains power 102 becomes available again, the charger 104 recharges the battery 106. Since the battery 106 provides the initial start-up power to the LPS 108, if the battery 106 becomes completely drained, the LPS 108 does not start up when mains power 102 becomes available again. When the mains power 102 becomes available after the battery 106 is drained, the LPS 108 may not be turned on if the battery 106 is drained beyond a LPS 108 turn-on threshold. If the LPS 108 is not turned on, it does not provide bias power to the charger 104 and UPS control 110, and the UPS 100 will not wake up to process input power.

A UPS unit typically includes one logic power supply (LPS), which is designed to receive power only from one or more batteries. As described above, when AC mains power is unavailable, the LPS continues to run on battery power. When AC mains power is available, it is directed in part to a battery charger, which charges the batteries and provides power to the LPS. However, if AC power is unavailable and the batteries become fully discharged, the LPS turns off. Additionally, when AC mains power becomes available again, the LPS does not immediately turn on, since the batteries draw the charge provided from the charger. In existing UPS units, the LPS cannot turn on until the batteries are sufficiently recharged.

Figure 2:
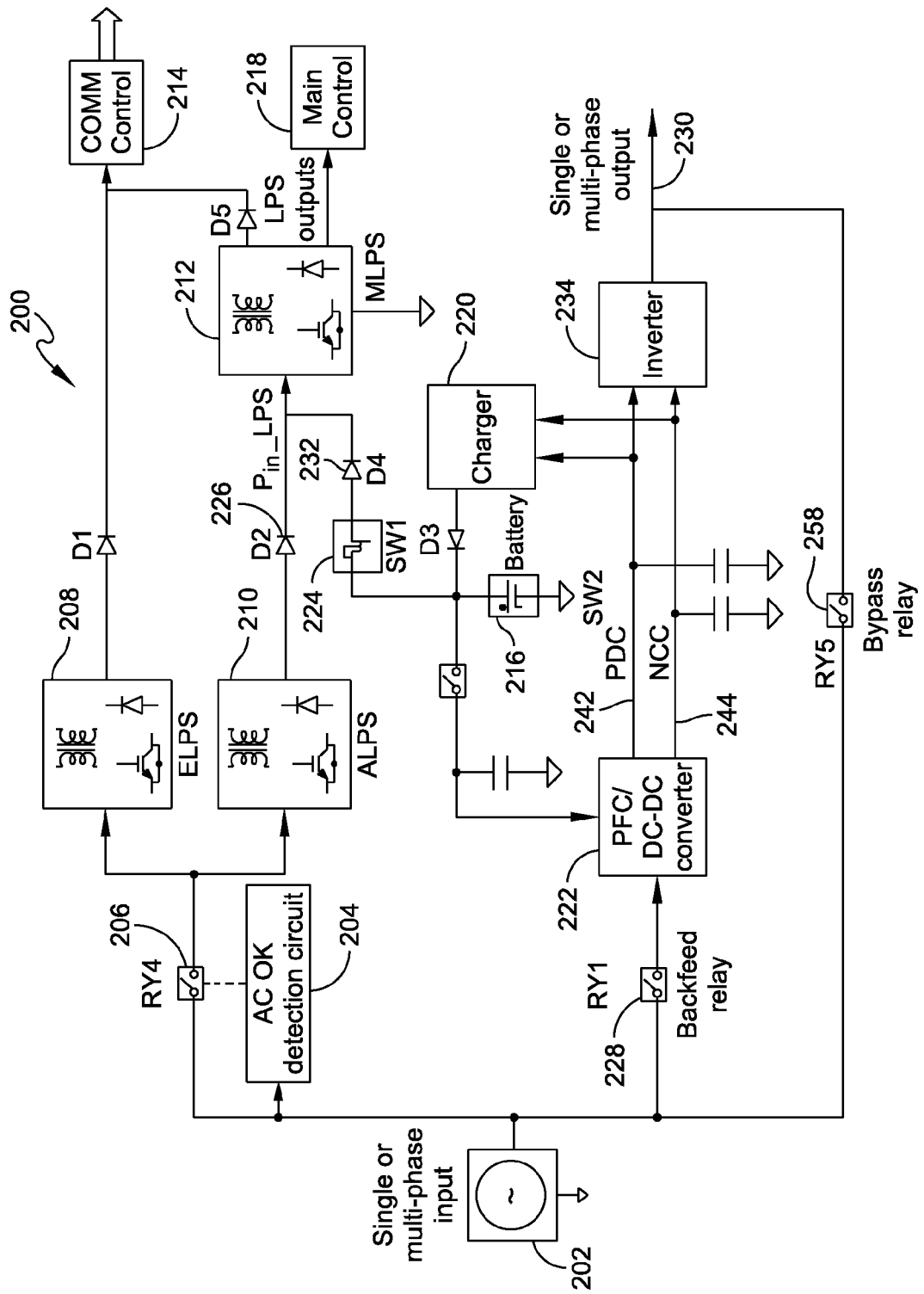
FIG. 2 is a schematic diagram of a UPS design in accordance with an embodiment of the invention.

FIG. 2 shows a UPS 200 according to one embodiment of the invention. The UPS 200 includes a first relay 206, an AC detection circuit 204, a battery 216, a first LPS 210, a second LPS 208, a main LPS 212, a main controller 218 and a communication circuit 214. The UPS 200 also includes a power factor correction (PFC) converter 222, a charger 220, an inverter 234, and an output 230. The UPS 200 receives input power from an AC mains power supply 202 (single- or multi-phase) and outputs power at line 230. The output power at line 230 may be single- or multi-phase. The AC mains power supply 202 is coupled to the AC detection circuit 204 and the first relay 206, and the AC detection circuit 204 is coupled to the first relay 206. The first relay 206 is coupled to the first LPS 210 and the second LPS 208. The first LPS 210 is coupled to the main LPS 212. The battery 216 is also coupled to the main LPS 212. According to one example, the first LPS 210 may be called an auxiliary LPS (ALPS) and the second LPS 208 may be called an economy LPS (ELPS).

The AC detection circuit 204 is configured to monitor the AC input voltage at start-up from the AC mains power supply 202. According to one embodiment, if the AC input voltage is within an acceptable range, the AC detection circuit 204 closes the first relay 206 to couple the AC mains power supply 202 to the first LPS 210 and the second LPS 208. In one example, an acceptable range for the AC mains power supply 202 is between approximately 100 Vrms and approximately 300 Vrms.

The communication circuit 214, in one embodiment provides a communications interface to a user interface of the UPS 200. In addition, the communication circuit 214 may be coupled to one or more communication networks to allow the UPS 200 to be monitored and/or controlled from remote devices over one or more networks.

When AC input voltage is available and within an acceptable range at startup, the second LPS 208 remains in an OFF state. The first LPS 210 receives the AC input voltage and the first LPS 210 converts the input AC voltage to a DC voltage and provides the DC voltage to the main LPS 212. According to one embodiment, the first LPS 210 and the main LPS 212 power up automatically when AC mains power is available at startup. In one example, the first LPS 210 outputs DC power between about 225 Vdc to about 450 Vdc. The first LPS 210 outputs the DC power to the main LPS 212. The main LPS 212 powers the main controller 218 and the communication circuit 214.

Figure 3:
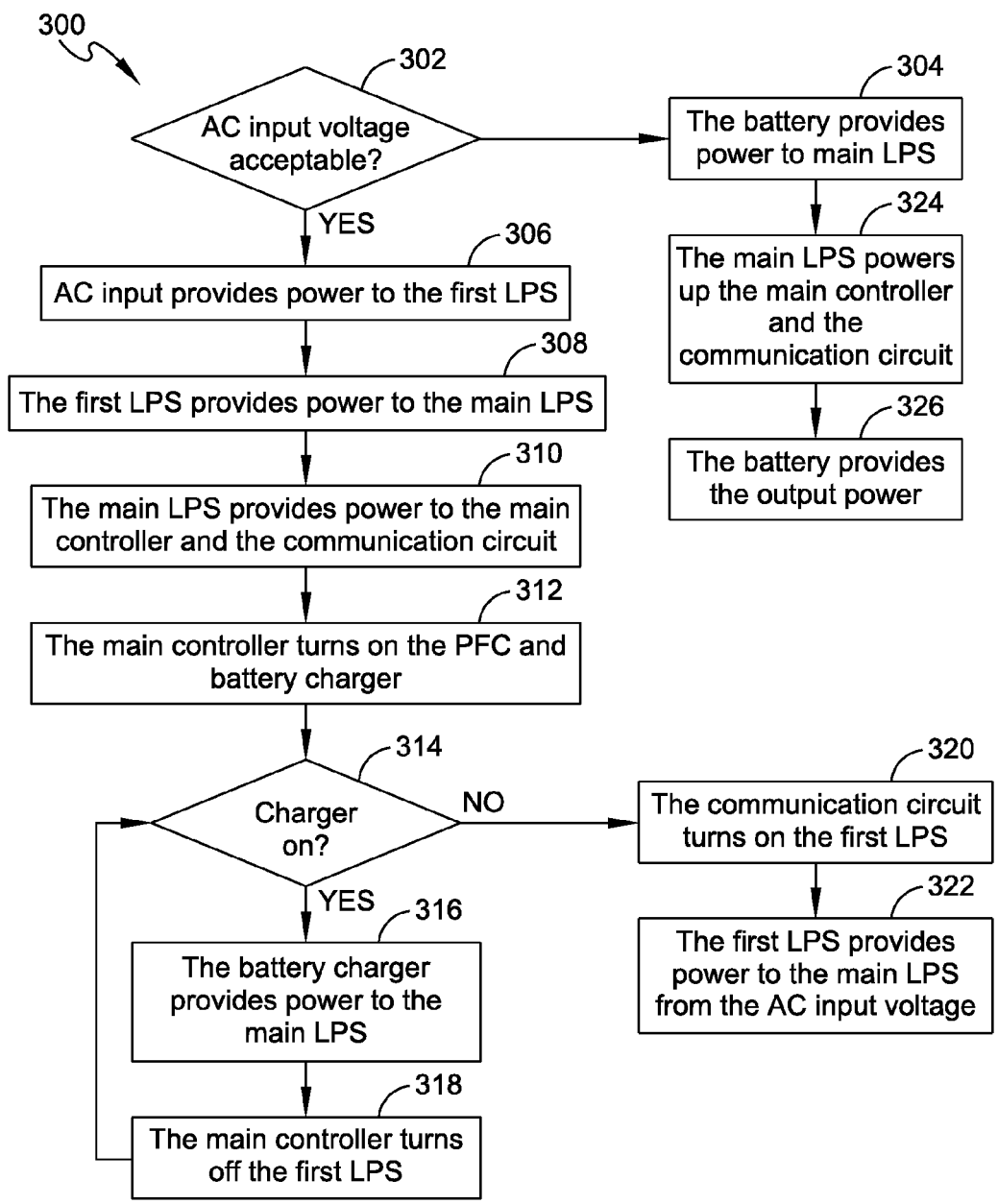
FIG. 3 shows a flow chart of a method of powering the main LPS in a UPS in accordance with an embodiment of the invention.

FIG. 3 shows a flow chart of a method 300 of powering the UPS 200 at startup, according to an embodiment of the invention. At block 302, the AC detection circuit 204 determines whether the AC input voltage from an AC mains power supply 202 is acceptable. If the AC input voltage is not acceptable at block 302, at block 304 the battery 216 provides power to the main LPS 212. The main LPS powers the main controller 218 and the communication circuit 214 (block 324). At block 326, the battery 216 provides the UPS output power at line 230.

If the AC input voltage is acceptable at block 302, at block 306 the AC input voltage is coupled to the first LPS 210. The first LPS 210 may be an auxiliary LPS. At block 308, the first LPS 210 converts the AC input voltage to DC voltage and provides DC voltage to the main LPS 212. At block 310, the main LPS 212 provides power to the main controller 218 and the communication circuit 214.

At block 312, the main controller 218 powers up the PFC converter 222 and the battery charger 220, and provides output power from the UPS 200 derived from the input power. At block 314, the main controller 218 determines whether the battery charger 220 successfully turned on. If the battery charger 220 is on, at block 316 the battery charger 220 provides power to the main LPS 212. At block 318, the main controller 218 turns off the first LPS 210, and the main LPS 212 receives power from the battery charger 220. The main controller 218 monitors the battery charger 220 at block 314, to ensure that the battery charger 220 remains on. At block 314, if the battery charger 220 fails or stops providing power to the main LPS 212, then at block 320, the communication circuit 214 turns on the first LPS 210 to power the main LPS 212 from the input AC voltage.

In the embodiment shown in FIG. 2, the PFC 222 includes a DC-DC converter. The PFC 222 also includes an AC-DC converter. The PFC 222 receives input voltage from the AC mains power supply 202 when the second relay 228 is closed. The PFC 222 is shown coupled to the battery 216 and the inverter 234. According to one feature, the main controller 218 controls the PFC 222 and the inverter 234. In line mode of operation, under control of the main controller 218, the PFC 222 receives the AC input voltage and provides positive and negative DC voltages at lines 242 and 244. In a battery mode of operation, upon loss of input AC power, the PFC 222 generates the DC voltages at lines 242 and 244 from the battery 216. The inverter 234 receives the DC voltages from the PFC 222 and provides an output AC voltage at line 230. In the embodiment shown in FIG. 2 only one battery is shown, however, in different embodiments, the battery 216 may be implemented using a combination of batteries coupled in parallel and/or in series to provide the voltage and capacity necessary for a given implementation.

The main controller 218 provides monitoring and control of components of the UPS 200. In FIG. 2, the controller 218 is shown as coupled only to the main LPS 212. However, according to one embodiment, the main controller 218 is coupled to the PFC 222 and the inverter 234. According to another embodiment, the main controller 218 may be coupled to all major components of the UPS 200 and may also be coupled to numerous sensing devices to monitor operational parameters of the UPS 200.

According to one embodiment, when the AC power is unavailable, the battery 216 may be used to turn on the UPS 200 by first turning on the main LPS 212. A user may turn on the main LPS 212 by pressing the switch 224. The switch 224 causes the main LPS 212 to power up using power from the battery 216. If the AC mains power 202 subsequently becomes available, the battery charger 220 provides power to the main LPS 212 and charges the battery 216. If the charger 220 fails, the communication circuit 214 turns on the first LPS 210, which provides power to the main LPS 212 from the AC mains power supply 202.

According to various embodiments, the UPS 200 includes multiple modes of operation. For example, the UPS 200 includes first and second green modes of operation, in which the UPS 200 consumes less power and is more energy efficient. In another example, the UPS 200 includes a standby mode and a sleep mode, in which the UPS 200 consumes little power and is energy efficient. The UPS 200 may also include an Emergency Power Off mode of operation. In one example, the UPS 200 is configured to transfer to a bypass mode of operation if the AC mains power supply 202 fails.

According to one embodiment, the UPS 200 includes a first green mode option. In the first green mode, the main LPS 212 receives power from the charger 220 and the first LPS 210 is turned off. The PFC 222 receives power from the AC mains and the PFC 222 provides power to the charger 220. The main LPS 212 provides power to the main controller 218 and the communication circuit 214. The PFC 222 provides power to the inverter 234 over lines 242 and 244, and the inverter 234 provides the UPS 200 output voltage at line 230. The first LPS 210 and the second LPS 208 remain in an OFF state in the first green mode.

According to another embodiment, the UPS 200 includes a second green mode option. In the second green mode, the main controller 218 turns off the charger 220. The communication circuit 214 turns on the first LPS 210. The first LPS 210 provides power to the main LPS 212 through a first diode 226. According to one feature, turning off the charger 220 reduces tare losses. In one embodiment, the PFC 222 provides power to the inverter 234 over lines 242 and 244, and the inverter 234 provides the UPS 200 output voltage at line 230. According to another embodiment, the main controller 218 turns off the PFC 222, and output power is provided from the AC input power supply 202 directly to the output line 230 through the fourth relay 258. According to one feature, the UPS 200 output voltage at line 230 is maintained at about a constant level when the UPS 200 mode of operation is transferred from the second green mode option to an AC mains power input mode.

According to another embodiment, the UPS 200 includes a standby mode option. In the standby mode, the main controller 218, the communication circuit 214, the first LPS 210 and the main LPS 212 are powered on, while all other components of the UPS 200 are turned off. For example, in the standby mode, the PFC 222, the inverter 234, and the charger 220 are turned off. According to one feature, the standby mode reduces the energy consumption of the UPS 200. In the standby mode, the output power is provided from the AC input power supply 202 directly to the output line 230 through the fourth relay 258. The first LPS 210 provides power to the main LPS 212 through the first diode 226. According to one feature, when the UPS 200 enters the standby mode, the communication circuit 214 turns on the first LPS 210. According to another feature, when the UPS 200 enters the standby mode, the main controller 218 turns off the charger 220. According to one feature, turning off the charger 220 reduces tare losses, improving the efficiency of the system.

Figure 4:
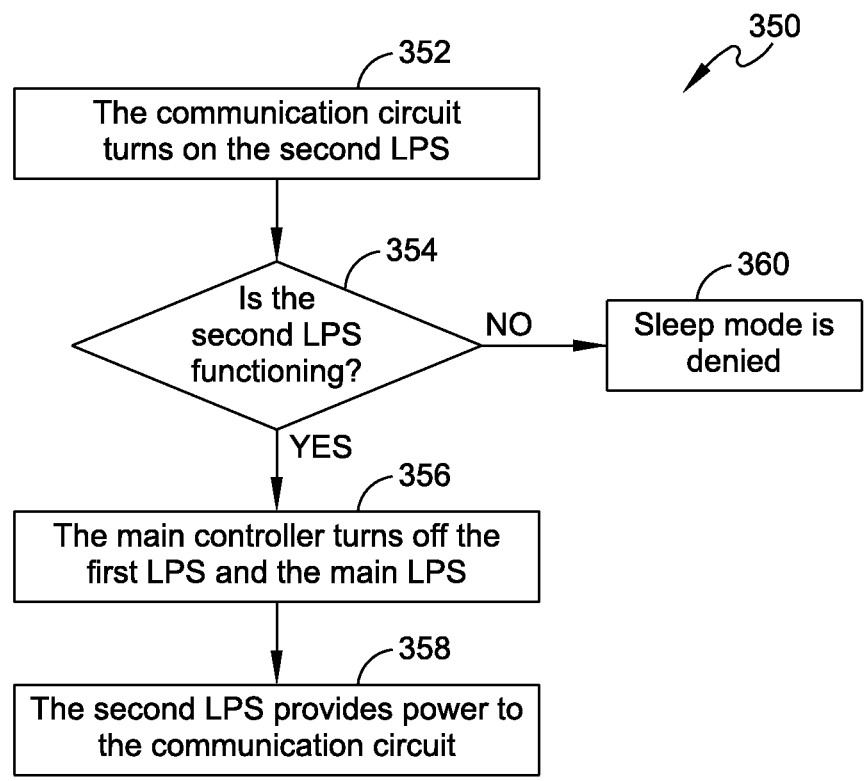
FIG. 4 shows a flow chart of a method of switching a UPS to a sleep mode of operation in accordance with an embodiment of the invention.

According to another embodiment, the UPS 200 includes a sleep mode option. According to one feature, in sleep mode, all the components of the UPS 200 are turned off except the second logic power supply 208 and the communication circuit 214. The sleep mode option will now be described with reference to the flow chart 350 in FIG. 4. To enter the sleep mode, at block 352, the communication circuit 214 turns on the second LPS 208. The second LPS 208 may be an economy LPS. At block 354, the communication circuit 214 determines if the second LPS 208 is functioning. If the second LPS 208 is not functioning, at block 360, the UPS 200 does not enter the sleep mode. If the second LPS 208 is functioning, at block 356, the main controller 218 turns off the first LPS 210 and the main LPS 212, as well as the PFC 222, the charger 220, the battery 216 and the inverter 234. In sleep mode, at block 358, the second LPS 208 provides power to the communication circuit 214. In one example, the communication circuit 214 is coupled to a user interface, which continues to receive power from the second LPS 208. A user may interact with the user interface to control the UPS 200 to exit sleep mode and either enter one of the other operational modes of the UPS 200 or power the UPS 200 off. According to one example, the power consumption of the UPS 200 in sleep mode is between about 5 watts and about 10 watts.

According to one embodiment, the UPS 200 may exit the sleep mode and turn on the main LPS 212 when a user presses an ON/OFF button. If the battery 216 is present and has a charge, the battery 216 will provide power to the main LPS 212 through the switch 224 and a second diode 232. If the battery 216 is not present or is discharged, and AC power is available, the first LPS 210 will turn on and provide power to the main LPS 212 through the first diode 226.

According to another embodiment, the UPS 200 may exit the sleep mode and turn on the main LPS 212 when the communication circuit 214 instructs the first LPS 210 to turn on. The request that the UPS 200 exit the sleep mode may come from a Network Management Card (NMC) or another available user communication port. According to one example, the NMC may be a UPS NMC available from APC by Schneider Electric. In one example, the communication circuit 214 may instruct the the first LPS 210 to turn on and cause the UPS 200 to exit the sleep mode to recharge the battery 216. In another example, the UPS 200 may be programmed to turn on the main LPS 212 after a selected period of time to check the state of the battery 216 and determine whether to charge the battery 216.

According to another embodiment, the UPS 200 may exit the sleep mode when AC mains power supply 202 is available by cycling the AC mains power supply 202. In one example, cycling includes turning the AC mains power supply 202 off and then turning the AC mains power supply 202 on again. Cycling the power in one embodiment initiates the process 350 described above with reference to FIG. 3.

According to one feature, when the UPS 200 exits the sleep mode and the main LPS 212 is operational, the second LPS 208 is turned off. The communication circuit 214 may turn the second LPS 208 off.

According to another embodiment, the UPS 200 includes an Emergency Power Off (EPO) mode option. In the EPO mode, the second LPS 208, the first LPS 210 and the main LPS 212 are powered off. In one example, the UPS 200 may exit the EPO mode if the UPS ON/OFF button (not shown) is activated. In another example, the UPS 200 may exit the EPO mode if the AC mains power supply 202 and the battery 216 are removed.

The UPS 200 may be implemented as a single phase power supply, a three phase power supply or as a split phase supply and different embodiments may be designed to accommodate various input voltages. Further, the UPS 200 may be implemented as a modular, scalable UPS having multiple replaceable power modules and battery modules as described in U.S. Pat. No. 5,982,652 and in U.S. Pat. No. 7,446,433, both of which are assigned to the assignee of the present application and incorporated by reference herein. Additionally, the UPS 200 may be implemented as an uninterruptible power supply for providing power to a load as described in U.S. Pat. No. 7,939,968, which is assigned to the assignee of the present application and incorporated by reference herein.

Figure 5:
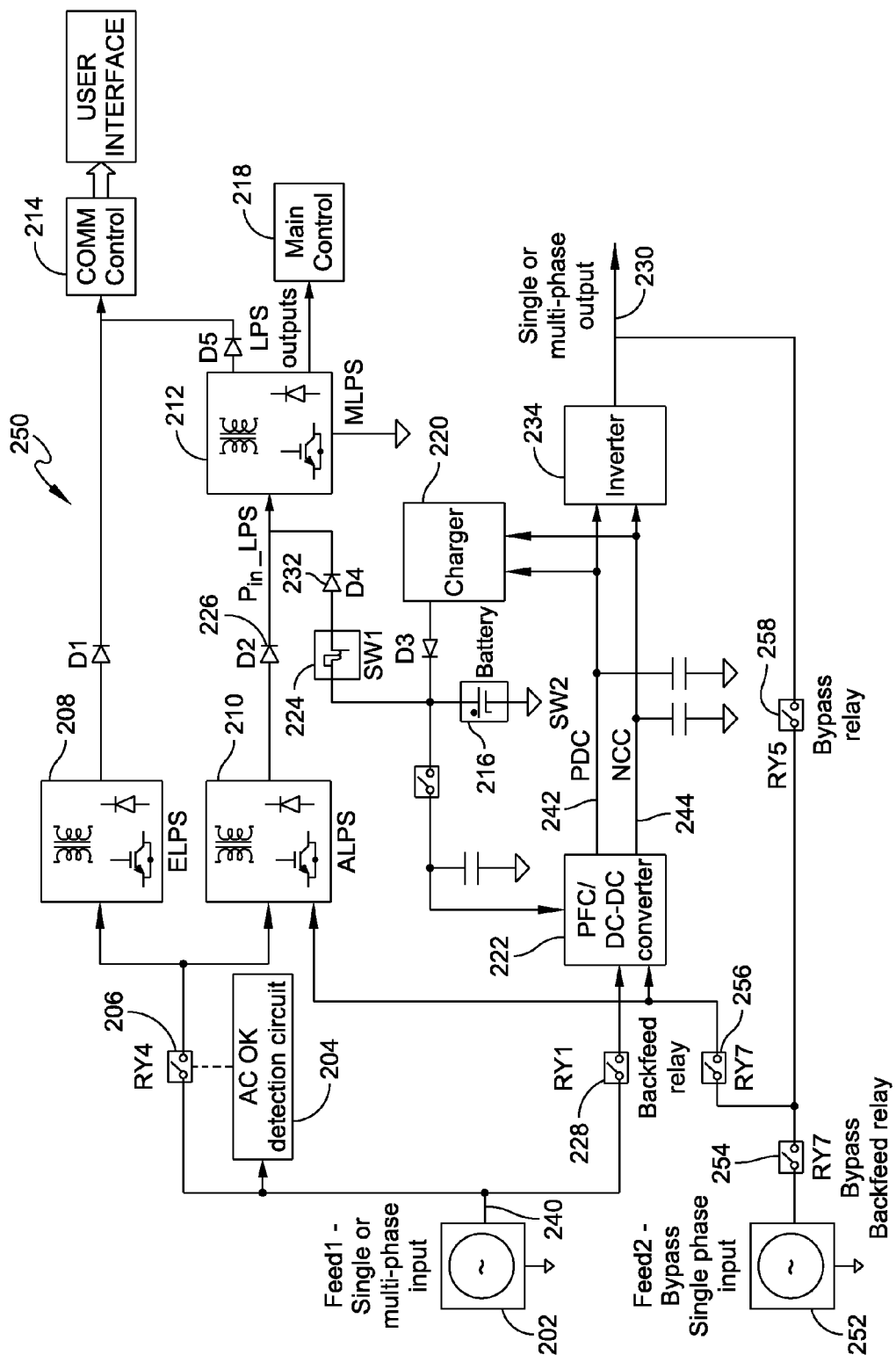
FIG. 5 is a schematic diagram of an alternative UPS design in accordance with an embodiment of the invention.

FIG. 5 is a schematic diagram of another UPS 250 according to an embodiment of the invention. The UPS 250 is similar to the UPS 200 and similar components are labeled with the same reference numbers. The UPS 250 differs from the UPS 200 in that, for example, the UPS 250 includes a second input feed 252. According to various examples, the second input feed 252 may be an AC mains input, including a single phase power supply, a three phase power supply or a split phase power supply. According to one embodiment, the UPS 250 operates in all of the modes described above for UPS 200 and also includes a first bypass mode option. In the first bypass mode, the UPS 250 receives input power from the second input feed 252. In one example, the UPS 250 enters the first bypass mode after failure of the AC power at input 240. The second relay 254 and the third relay 256 are closed and the PFC 222 operates from the second input feed 252. The PFC 222 outputs DC power to the charger 220. The main LPS 212 continues to operate from the charger 220 output. According to one example, the PFC 222 provides power at lines 242 and 244, and the inverter 234 provides the output power at line 230.

According to another embodiment, the UPS 250 also includes a second bypass mode. In the second bypass mode, the UPS 250 receives input power from the second input feed 252. In one example, the UPS 250 enters the second bypass mode upon failure of the AC mains power supply 202. In the second bypass mode, the communication circuit 214 turns on the first LPS 210, and the first LPS 210 outputs power to the main LPS 212 through the first diode 226. The main controller 218 turns off the charger 220. The main controller 218 may turn off the PFC 222. When the PFC 222 is turned off, the second input feed 252 provides the output voltage at line 230 through the second relay 254 and the fourth relay 258. According to one feature, turning off the charger 220 reduces tare losses, and turning off the PFC 222 increases the efficiency of the UPS 250.

According to another embodiment, the UPS 250 may utilize a third bypass mode of operation when input voltage is available at the second input feed 252 and not available at the AC mains power supply 202. In the third bypass mode of operation, AC voltage at the second input feed 252 is provided through the second relay 254 and the fourth relay 258 to the output 230. The third bypass mode of operation may be used in place of the battery mode of operation to save battery life or may be used after battery mode when the batteries have become partially drained. In one embodiment, the UPS 250 may also include a mechanical bypass switch coupled directly between the second input feed 252 and the output 230. The mechanical bypass allows a user to completely bypass the UPS 250 upon failure of the UPS 250 or to provide maintenance to the UPS 250.

Any of the preceding embodiments can be implemented within a UPS, for example, a UPS having a DC battery as a backup power source. The UPS may be configured to provide backup power for any number of power consuming devices, such as computers, servers, network routers, air conditioning units, lighting, security systems, or other devices and systems requiring uninterrupted power. The UPS may contain, or be coupled to, a controller or control unit to control the operation of the UPS. For example, the controller may provide pulse width modulated (PWM) signals to each of the switching devices within the circuit for controlling the power conversion functions. In another example, the controller may provide control signals for the relays. In general, the controller controls the operation of the UPS such that it charges the battery from the AC power source when power is available from the AC power source, and inverts DC power from the battery when the AC power source is unavailable or during brown-out conditions. The controller may include hardware, software, firmware, a processor, a memory, an input/output interface, a data bus, and/or other elements in any combination that may be used to perform the respective functions of the controller.

In the embodiments described above, a battery is used as a backup power source. In other embodiments, other AC or DC backup sources and devices may be used including fuel cells, photovoltaics, DC micro turbines, capacitors, an alternative AC power source, any other suitable power sources, or any combination thereof. In embodiments of the invention that utilize a battery as a backup power source, the battery may be comprised of multiple batteries of cells coupled in parallel or in series.

In one or more of the preceding embodiments, the switching devices may be any electronic or electromechanical device that conducts current in a controlled manner (e.g., by using a control signal) and can isolate a conductive path. Representations of various switching devices, and other electronic devices, in the figures are exemplary and not intended to be limiting, as it will be appreciated by one skilled in the art that similar or identical functionality may be obtained using various types, arrangements, and configurations of devices. For example, one or more of the switching devices may contain one or more anti-parallel diodes, or such diodes may be separate from the switching devices. As indicated above, in some embodiments, the switching devices include a rectifier, for example, a controlled rectifier that can be turned on and off with the application of a control signal (e.g., an SCR, a thyristor, etc.). Additionally, other devices, such as resistors, capacitors, inductors, batteries, power supplies, loads, transformers, relays, diodes, and the like may be included in a single device, or in a plurality of connected devices.

In the embodiments described above, rectifier/boost circuits are described for use with uninterruptible power supplies, although it should be appreciated that the circuits described herein may be used with other types of power supplies.

Embodiments of the present invention may be used with uninterruptible power sources having a variety of input and output voltages and may be used in single phase or multiphase uninterruptible power supplies.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, the gating pulses used to operate the switching devices of the power converter may vary in frequency, duty cycle, or both. Further, alternative configurations of electrical components may be utilized to produce similar functionality, for example, inverter and charger functions, or other functions. Accordingly, the foregoing description and drawings are by way of example only.

What is claimed is:

1. An uninterruptible power supply comprising:
   a first input to receive input power from an input power source;
   an output to provide output power;
   a switch configured to close when a characteristic of the input power is within a selected range;
   a first logic power supply coupled to the switch, configured to receive input power from the input power source when the switch is closed, and having a first DC output;
   a backup power source having a second DC output and coupled to the first DC output at a common node;
   a charger having a third DC output and coupled to the common node;
   a main logic power supply coupled to the common node and configured to receive the first DC output, the second DC output and the third DC output; and
   power converter circuitry coupled to the backup power source and the first input and configured to provide the output power derived from at least one of power at the first input and power from the backup power source.

2. The uninterruptible power supply of claim 1, further comprising:
   a main controller for controlling operation of the uninterruptible power supply; and
   a communication circuit configured to allow a user to select a mode of operation of the uninterruptible power supply;
   wherein the main logic power supply is coupled to the main controller and the communication circuit and further configured to provide power to the main controller and the communication circuit.

3. The uninterruptible power supply of claim 2, further comprising a second logic power supply coupled to the switch, configured to receive input power from the input power source when the switch is closed, and configured to power the communication circuit.

4. The uninterruptible power supply of claim 1, wherein the power converter circuitry includes:
   an AC-to-DC converter coupled to the first input and having a fourth DC output; and
   an inverter coupled to the AC-to-DC converter and the UPS output.

5. The uninterruptible power supply of claim 4, wherein the charger is further coupled to the AC-to-DC converter and the backup power source, and wherein the charger receives the fourth DC output and provides the third DC output to the backup power source to charge the backup power source.

6. The uninterruptible power supply of claim 1, further comprising a second input to receive power from a second input power source, wherein the second input is selectively coupled to the UPS output to provide output power from the second input power source.

7. A method for providing uninterrupted power from a power supply having a first input to receive input power and a UPS output from which UPS output power is provided, the method comprising:
   providing power from the first input to a first logic power supply having a first DC output when the input power at the first input is acceptable;
   providing the first DC output to a main logic power supply having an MLPS output;
   providing the MLPS output to a main controller and a communication circuit;
   turning on, with the main controller, a charger having a third DC output;
   providing the third DC output to the main logic power supply;

turning off the first logic power supply;
determining whether the charger is operating acceptably;
if the charger is not operating acceptably, turning on the first logic power supply; and
providing output power at the UPS output.

8. The method of claim 7, further comprising:
providing power to the main logic power supply from a back-up power source having a second DC output upon loss of the input power.

9. The method of claim 8, further comprising:
charging the back-up power source with the third DC output.

10. The method of claim 7, further comprising:
providing power from the first input to a second logic power supply;
providing power to the communication circuit from the second logic power supply in a sleep mode of operation; and
turning off the first logic power supply, the main logic power supply, the main controller and the charger in the sleep mode of operation.

11. The method of claim 7, further comprising:
providing power from the first input to an AC-to-DC converter having a fourth DC output;
providing the fourth DC output to an inverter; and
providing the fourth DC output to the charger.

12. The method of claim 7, further comprising:
providing power from a second input to the first logic power supply when the input power at the first input is not acceptable.

13. An uninterruptible power supply comprising:
a first input to receive input power from an input power source;
a backup power source having a DC output coupled to a common node;
a UPS output configured to provide output power derived from at least one of the input power and power from the backup power source;
a charger coupled to the backup power source through the common node;
a main controller for controlling operation of the uninterruptible power supply;
a communication circuit configured to allow a user to select a mode of operation of the uninterruptible power supply;
a main logic power supply coupled to the common node and configured to receive power derived from the input power source, the charger, and the backup power source, and further configured to provide power to the main controller and the communication circuit; and
means for providing power to the main logic power supply in a start up mode of operation from the input power bypassing the backup power source and the charger.

14. The uninterruptible power supply of claim 13, further comprising means for providing power to the communication circuit in a sleep mode of operation from the input power bypassing the backup power source and the charger.

15. The uninterruptible power supply of claim 14, further comprising means for exiting the sleep mode of operation using the communication circuit.

16. The uninterruptible power supply of claim 13, further comprising means for providing power to the main logic power supply through the charger in a green mode of operation bypassing a first logic power supply.

17. The uninterruptible power supply of claim 13, further comprising means for providing power to the main logic power supply in a green mode of operation bypassing the backup power source and the charger.

18. The uninterruptible power supply of claim 13, further comprising means for providing power to the main logic power supply in a bypass mode of operation bypassing the first input.

19. The uninterruptible power supply of claim 13, further comprising means for providing the UPS output in a bypass mode of operation bypassing the backup power source, the charger and the main logic power supply.

* * * * *